(12) United States Patent
Nader et al.

(10) Patent No.: US 7,848,756 B2
(45) Date of Patent: Dec. 7, 2010

(54) RADIO ACCESS TECHNOLOGY SELECTION

(75) Inventors: Ali Nader, Malmö (SE); Bengt Lindoff, Bjärred (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 21 days.

(21) Appl. No.: 12/330,721

(22) Filed: Dec. 9, 2008

(65) Prior Publication Data

US 2010/0075665 A1    Mar. 25, 2010

Related U.S. Application Data

(60) Provisional application No. 61/098,877, filed on Sep. 22, 2008.

(51) Int. Cl.
*H04Q 7/20* (2006.01)
(52) U.S. Cl. .................. 455/436; 455/437; 455/439; 370/331
(58) Field of Classification Search ............ 455/436, 455/437, 439; 370/331
See application file for complete search history.

(56) References Cited

U.S. PATENT DOCUMENTS

| | | | |
|---|---|---|---|
| 2004/0198360 A1* | 10/2004 | Kotzin | 455/445 |
| 2006/0223575 A1 | 10/2006 | Su | |
| 2007/0026811 A1 | 2/2007 | Blume | |
| 2007/0217349 A1 | 9/2007 | Fodor et al. | |
| 2007/0230420 A1 | 10/2007 | Bumiller et al. | |
| 2008/0045262 A1 | 2/2008 | Phan et al. | |
| 2008/0188228 A1* | 8/2008 | Pecen et al. | 455/449 |

FOREIGN PATENT DOCUMENTS

| EP | 1 968 283 A1 | 9/2008 |
|---|---|---|
| WO | WO 2004/079478 A2 | 9/2004 |
| WO | WO 2009/078675 A1 | 6/2009 |

* cited by examiner

*Primary Examiner*—Danh C Le
(74) *Attorney, Agent, or Firm*—Potomac Patent Group PLLC

(57) ABSTRACT

A method of operating a wireless communication device may include predicting an application expected to be used based on a user interaction with the wireless communications device, determining a preferred radio access technology (RAT) based on the predicted application, determining whether the wireless communications device is currently utilizing the determined preferred RAT as a current RAT, and performing one of ensuring that the wireless communications device continues to utilize the current RAT when the determined preferred RAT corresponds to the current RAT, or searching for the determined preferred RAT when the current RAT does not correspond to the determined preferred RAT and selecting the determined preferred RAT, based on the searching, when the determined preferred RAT is found.

20 Claims, 5 Drawing Sheets

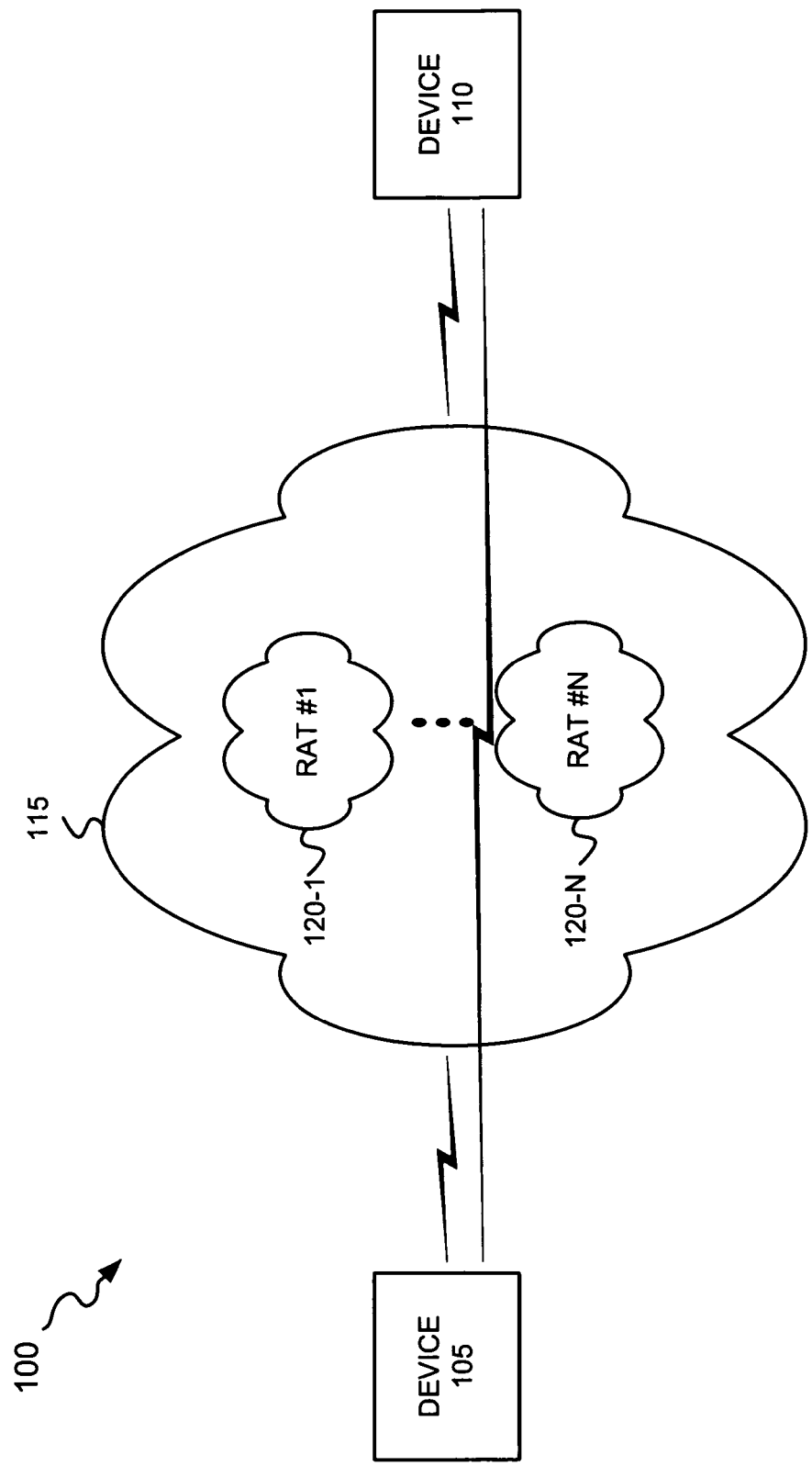

| APPLICATION 240 | PREFERRED RAT 1 245 | PREFERRED RAT 2 250 | PREFERRED RAT 3 255 | APPLICATION NOT POSSIBLE 260 |
|---|---|---|---|---|
| SPEECH | GSM | WLAN | WCDMA | |
| VIDEO TELEPHONY | WCDMA | LTE | | GSM/WLAN |
| MBMS | LTE | WCDMA | GSM | WLAN |
| ••• | ••• | ••• | ••• | ••• |
| DATA TRANSFER | LTE | WCDMA | GSM/WLAN | |

RADIO ACCESS TECHNOLOGY SELECTION

RELATED APPLICATION

This application claims priority to U.S. Provisional Patent Application No. 61/098,877, filed on Sep. 22, 2008, the disclosure of which is incorporated by reference herein in its entirety.

TECHNICAL FIELD

Implementations described herein relate generally to selection of radio access technologies (RATs) by a wireless communication device.

BACKGROUND

A wireless communication device (e.g., a user equipment (UE)) may have a variety of RATs available depending on its location. For example, it is not uncommon for multiple RATs (e.g., Long Term Evolution (LTE), Wireless Local Area Network (WLAN), High-Speed Packet Access (HSPA), etc.) to be accessible to the UE at the same time at any given location. These RATs may offer similar and/or overlapping services, such as voice, data, or messaging services. Multi-mode UEs are designed to support two or more RATs. Typically, for this type of UE, a selection between multiple RATs is implemented.

SUMMARY

It is an object to improve the operability of devices within a communications system based on the RAT selection scheme (s) described herein.

According to one aspect, a method may include predicting an application expected to be used based on a user's interaction with the wireless communications device, determining a preferred radio access technology (RAT) based on the predicted application, determining whether the wireless communications device is currently utilizing the determined preferred RAT, and performing one of ensuring that the wireless communications device continues to utilize the current RAT when the determined preferred RAT corresponds to the current RAT, or searching for the determined preferred RAT when the current RAT does not correspond to the determined preferred RAT and selecting the determined preferred RAT, based on the searching, when the determined preferred RAT is found.

According to another aspect, a wireless communications device may include at least one processor. The at least one processor may be configured to predict an application expected to be used based on a user's interaction with the wireless communications device, determine a preferred radio access technology (RAT) based on the predicted application, determine whether a current RAT being utilized by the wireless communications device corresponds to the determined preferred RAT, and perform one of ensure that the wireless communications device continues to utilize the current RAT when the determined preferred RAT corresponds to the current RAT, or search for the determined preferred RAT when the current RAT does not correspond to the determined preferred RAT, and select the determined preferred RAT, based on the searching, when the determined preferred RAT is found.

According to yet another aspect, a computer-readable medium containing instructions may be executable by at least one processor of a wireless communications device. The computer-readable medium may include one or more instructions for predicting an application that will be started based on a user's interaction with the wireless communications device; one or more instructions for determining a preferred radio access technology (RAT) based on the predicted application, one or more instructions for determining whether a current RAT being utilized by the wireless communications device corresponds to the preferred RAT, one or more ensuring that the wireless communications device continues to utilize the current RAT when the preferred RAT corresponds to the current RAT, and one or more instructions for searching for the preferred RAT when the current RAT does not correspond to the preferred RAT.

BRIEF DESCRIPTION OF THE DRAWINGS

FIG. 1 is a diagram illustrating devices communicating with one another via a communications system;

DETAILED DESCRIPTION

Figure 2A:
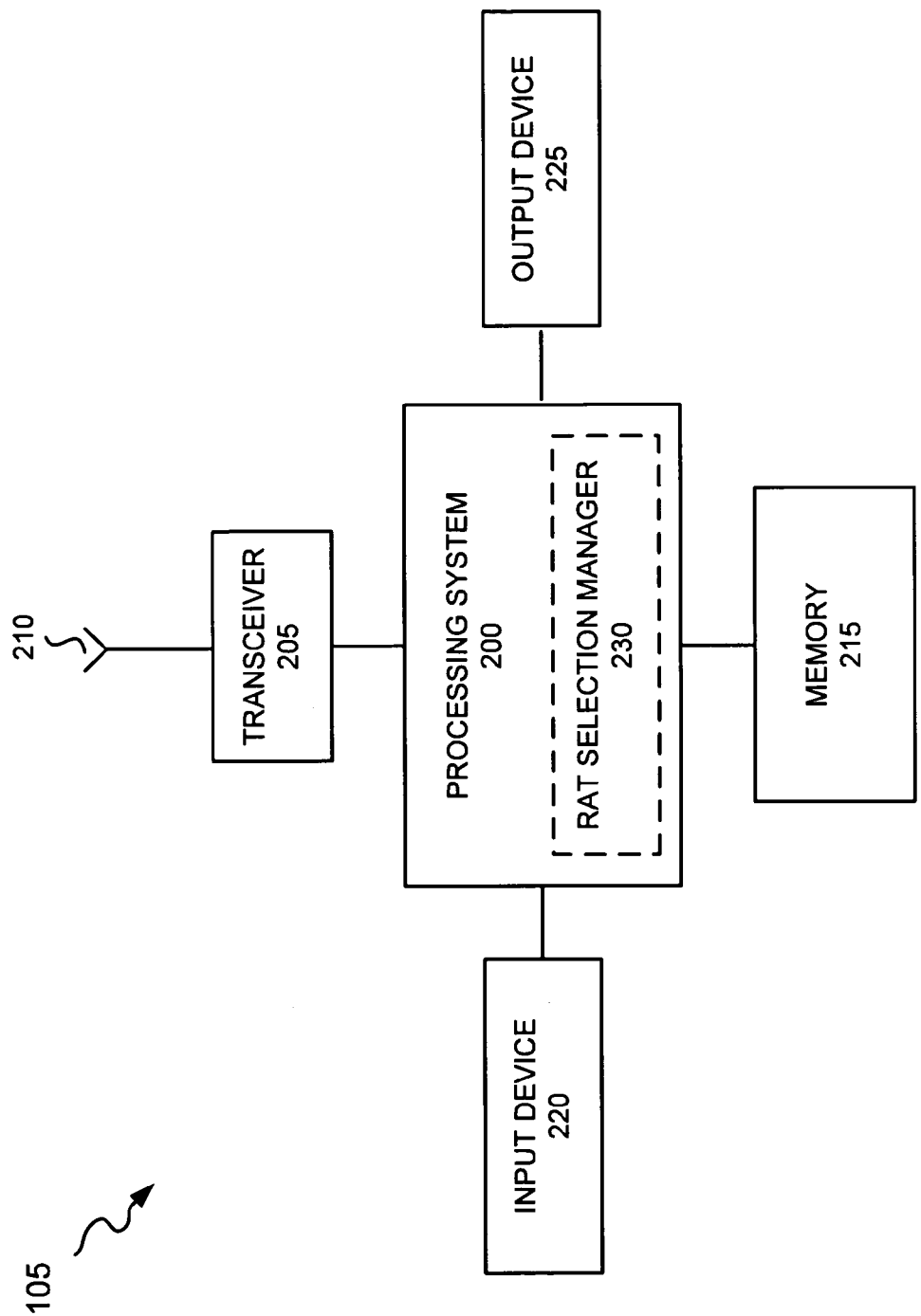
FIG. 2A is a diagram illustrating exemplary components of a device depicted in FIG. 1.

The following detailed description refers to the accompanying drawings. The same reference numbers in different drawings may identify the same or similar elements.

Typically, existing techniques for RAT selection are governed by measurements related to signal quality or pre-determined preferences established by a wireless operator. However, existing techniques for RAT selection do not account for user interaction with respect to a user device (e.g., a UE). In this regard, the selection of a RAT may be delayed and/or a user's experience may be hindered. For example, the selection of a RAT may be delayed by initiating a RAT selection scheme only after an application has been selected by a user. In contrast, according to the concepts described herein, a user's interaction with a user interface (UI) of the UE may provide sufficient information to predict the application to be selected. In such an instance, the RAT selection scheme may select a preferred RAT based on the application predicted to be chosen by a user. Additionally, or alternatively, according to the concepts described herein, other considerations may be utilized for selecting a preferred RAT, such as, monetary cost, power consumption, etc.), which may be beneficial to a user and/or the network operator.

The concepts described herein relate to an automatic selection of a RAT in a communications system based on a prediction of an application to be utilized by a user on a wireless communications device (e.g., a UE) or based on an application a user has already selected on the wireless communications device. By taking into consideration the application to be utilized or being utilized, the wireless communications device may not select a RAT that, for example, does not support the application (i.e., a denial of service), or may support the application, but not in an optimal way according to one or more criteria. In one implementation, the one or more criteria may include a cost criterion (i.e., a monetary cost) related to accessing (e.g., minimizing roaming fees) and/or utilizing the RAT for the application, a power consumption criterion (e.g., the wireless communications device may consume less power when the application is being utilized in one RAT over another RAT), a bandwidth criterion (e.g., a RAT may offer more bandwidth than another RAT for the application), and/or an availability criterion (e.g., the application may not be available via a RAT due to access technology specifications, or the wireless communications device does not implement the application for a particular RAT). In this way, a user's experience may be enhanced, as well as other advantages that may necessarily flow therefrom or are apparent from the description that follows. For example, network operators may minimize roaming fees and costs associated with a user accessing and utilizing other RATs.

The terms "communication system" and "network" may be used interchangeably throughout this description. The term "communication system" is intended to be broadly interpreted to include any type of wireless network, such as, for example, cellular or mobile networks (e.g., Global System for Mobile Communications (GSM), Universal Mobile Telecommunication System (UMTS), Long Term Evolution (LTE), Wideband Code Division Multiple Access (WCDMA), Ultra Mobile Broadband (UMB), High-Speed Packet Access (HSPA), ad hoc networks, Worldwide Interoperability for Microwave Access (WiMAX), Institute of Electrical and Electronics Engineers (IEEE) 802.X, etc.), or other types of wireless networks. The communication system may include two or more RATs.

The term "application" is intended to be broadly interpreted to include, for example, a software application that resides on a UE, a service accessible by the UE, or a software application that resides on another device to which the UE may access.

The term "RAT" is intended to be broadly interpreted to include any type of wireless access technology. For example, the wireless access technology may be based on a radio access technology (e.g., General Packet Radio Service (GPRS), WCDMA, LTE, GSM, etc.), a microwave access technology (e.g., Bluetooth, Worldwide Interoperability for Microwave Access (WiMAX), Institute of Electrical and Electronic Engineering (IEEE) 802.X, etc.), and/or a satellite access technology (e.g., two-way broadband satellite multimedia access, such as Time Division Multiple Access (TDMA), Frequency Division Multiple Access (FDMA), Digital Video Broadcasting-Return Channel via Satellite (DVB-RCS), etc.).

Embodiments described herein may automatically select a RAT among multiple RATs available according to one or more criteria. In one implementation, the selection of the RAT may be based on a database that specifies preferred RAT(s) for a given application. The preference of a RAT over another RAT may be governed by the one or more criteria, as described herein. It will be appreciated that other factors (e.g., signal quality, etc.), in addition to the one or more criteria, may be considered.

FIG. 1 is a diagram illustrating an exemplary communications system 100 in which the concepts described herein may be implemented. As illustrated, communications system 100 may include a device 105, a device 110, and a network 115 that includes RATs 120-1 through 120-N. As illustrated, device 105 may be communicatively coupled to device 110 via network 115.

Device 105 may include a wireless device having communication capability and further capable of performing RAT selection based on the concepts described herein. For example, device 105 may include a portable device, a handheld device, a wireless telephone, a mobile station, a UE, a computer, a personal digital assistant (PDA), a web browser, an Internet-based device, a personal communication systems (PCS) terminal, a kiosk terminal, a pervasive computing device, a gaming device, a music-playing device, a video-playing device, a vehicle-based user device, and/or some other type of wireless user device configured to perform one or more of the functions (i.e., RAT selection functions) associated with the concepts described herein.

Device 110 may include a device having communication capability. For example, device 110 may include a wireless station, a server, a wired station, a device 105, or some other device that provides a service, a resource, etc., and/or is accessible to device 105 and capable of maintaining an end-to-end communication link with device 105.

Network 115 may include one or more networks of any type, including a wireless network or a wired network. For example, network 115 may include a local area network (LAN), a wide area network (WAN), a telephone network, such as the Public Switched Telephone Network (PSTN) or a Public Land Mobile Network (PLMN), a satellite network, an intranet, the Internet, a data network, or a combination of networks or communication systems. RATs 120-1 through 120-N may include one or more access nodes (e.g., a network device) (not illustrated) that operate according to an access technology. For example, an access node may include a base station (BS), a base station transceiver (BTS) (e.g., in a GSM communication system), an eNodeB (e.g., in a LTE communication system), a Node B (e.g., in a UMTS communication system), a repeater, a relay, a gateway, or some other type of network device.

Although FIG. 1 illustrates an exemplary communications system 100, in other implementations, communication system 100 may include fewer, additional, or different devices, and/or a different arrangement to which the concepts described herein may be implemented.

FIG. 2A is a diagram illustrating exemplary components of device 105. As illustrated, device 105 may include a processing system 200, a transceiver 205, an antenna 210, a memory 215, an input device 220, an output device 225, and a RAT selection manager 230. The term "component," as used herein is intended to be broadly interpreted to include, for example, hardware or software and hardware.

Processing system 200 may interpret and/or execute instructions and/or data. For example, processing system 200 may include a general-purpose processor, a microprocessor, a data processor, a co-processor, a network processor, an application specific integrated circuit (ASIC), a controller, a programmable logic device, a chipset, and/or a field programmable gate array (FPGA). Processing system 200 may be capable of performing various communication-related processing (e.g., signal processing, channel estimation, power control, timing control, link adaptation, etc.), as well as other operations associated with the operation and use of device 105.

Transceiver 205 may transmit and receive information. For example, transceiver 205 may include transceiver circuitry for transmitting data to, and receiving data from, other devices and/or communication systems. Transceiver 205 may perform various communication-related processing (e.g., filtering, decoding/encoding, modulation, de-modulation, signal measuring, equalizing, amplifying, forward error correction (FEC), etc.). Antenna 210 may receive information and transmit information via wireless channels. Antenna 210 may include a multi-antenna system (e.g., a Multiple-in Multiple out (MIMO) antenna system) or some other type antenna system. Antenna 210 may provide one or more forms of diversity (e.g., spatial, pattern, or polarization).

Memory 215 may store information (e.g., data and/or instructions). For example, memory 215 may include a random access memory (RAM), a read only memory (ROM), and/or a flash memory. Memory 215 may include a storing device that is external to and/or removable from device 105. For example, memory 215 may include a Universal Serial Bus (USB) memory stick or a Subscriber Identity Module (SIM) card.

Input device 220 may receive input from a user and/or another device. For example, input device 220 may include a keyboard, a keypad, a mouse, a button, a switch, a microphone, a display, an input port, a biometric mechanism, and/or voice recognition logic.

Output device 225 may output information to a user and/or another device. For example, output device 225 may include a display, a speaker, one or more light emitting diodes (LEDs), a vibrator, an output port, and/or some other type of visual, auditory, and/or tactile output device.

As previously described, device 105 may be able to select from multiple RATs at any given location and time. The selection process may include consideration of an application to be utilized (e.g., predicting an application to be used) or an application being utilized. As described herein, device 105 may be capable of automatically selecting a RAT based on the application. Device 105 may consider one or more criteria to make such a selection, as described herein.

RAT selection manager 230 may automatically select a RAT based on an application to be utilized or an application being utilized. RAT selection manager 230 may consider one or more criteria to select a RAT. The one or more criteria may include a cost criterion (i.e., a monetary cost) related to accessing and/or utilizing the RAT for the application, a power consumption criterion (e.g., device 105 may consume less power when the application is being utilized in one RAT over another RAT), a bandwidth criterion (e.g., a RAT may offer more bandwidth than another RAT for the application), and/or an availability criterion (e.g., the application may not be available via a RAT due to access technology specifications, device 105 does not implement the application for a particular RAT). RAT selection manager 230 may perform other operations, as will be described in greater detail below and/or with respect to FIGS. 3A-3B.

Although, FIG. 2A illustrates exemplary components of device 105, in other implementations, device 105 may include fewer, additional, and/or different components, or differently arranged components than those depicted in FIG. 2A. For example, device 105 may include a hard disk or some other type of computer readable medium along with a corresponding drive. The term "computer-readable medium," as used herein, is intended to be broadly interpreted to include a physical or a logical storing device.

It will be appreciated that device 105 may include one or more applications which may be stored on a hard disk or some other computer readable medium (e.g., memory 215). Device 105 may also include a user interface (not illustrated) in which a user may access the one or more applications. Additionally, or alternatively, RAT selection manager 230 may include sub-components (not illustrated) that perform operations associated with the selection of a RAT, as will be described below with respect to FIGS. 3A-3B. Additionally, or alternatively, one or more of the tasks described as being performed by RAT selection manager 230 may be performed by one or more other components of device 105. Additionally, it will be appreciated that one or more components of device 105 may be capable of performing one or more other tasks associated with one or more other components of device 105.

In one embodiment, RAT selection manager 230 may be implemented in processing system 200 of device 105, as illustrated in FIG. 2A. However, it will be appreciated that RAT selection manager 230 may be implemented in connection with, for example, other components (e.g., transceiver 205) of device 105, in combination with two or more components (e.g., processing system 200, transceiver 205, memory 215) of device 105, and/or as an additional component(s) to those previously described in FIG. 2A.

Figure 2B:
FIG. 2B is a diagram of an exemplary RAT database.

As previously mentioned, RAT selection manager 230 may automatically select a RAT based on an application to be utilized or an application being utilized. In one embodiment, RAT selection manager 230 may select a RAT by referring to a database. FIG. 2B is a diagram of an exemplary RAT database 235. As illustrated, RAT database 235 may include an application field 240, a preferred RAT 1 field 245, a preferred RAT 2 field 250, a preferred RAT 3 field 255, and an application not possible field 260.

Application field 240 may identify an application that device 105 will utilize or is utilizing. Preferred RAT fields 245-255 may each identify a RAT to which the application may operate. In one embodiment, preferred RAT fields 245-255 may be oriented in a priority order. The order of priority may be based on a suitability of the application vis-à-vis the one or more criteria previously described, or the one or more criteria previously described in combination with other factors (e.g., signal quality, etc.). In the case where preferred RAT fields 245-255 are arranged in an order of priority, preferred RAT 1 field may be considered the most suitable RAT. For example, WCDMA may be the most suitable RAT for video telephony. Preferred RAT 2 field 250 may indicate a second choice and preferred RAT 3 field 255 may indicate a third choice. Application not possible field 260 may identify a RAT in which the application may not be supported. For example, video telephony is not supported by GSM or WLAN.

Although FIG. 2B illustrates an exemplary RAT database 235, it will be appreciated that the information fields described in relation to RAT database 235 are exemplary. In other implementations, RAT database 235 may include additional, different, or fewer informational fields than those depicted in FIG. 2B. Additionally, or alternatively, in one embodiment, device 105 may permit a user to configure the one or more criteria to which RATs are selected. For example, if a user is primarily concerned with monetary cost, RAT selection manager 230 may be configured to consider monetary cost, even though RAT selection manager 230 may be capable of considering criteria other than, or in addition to, monetary cost.

Figure 3A:
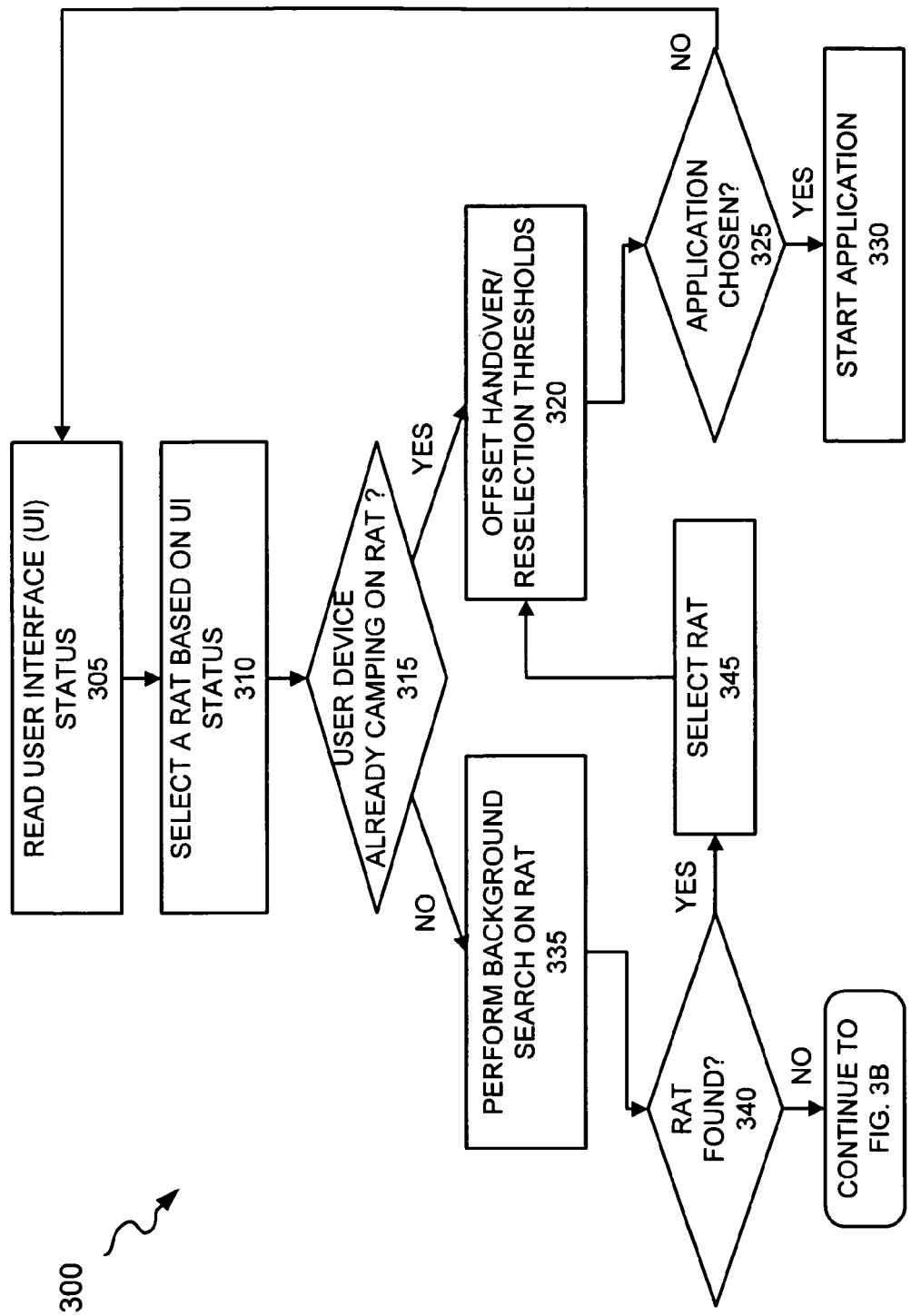
FIGS. 3A-3B are flow diagrams illustrating an exemplary process for selecting a preferred RAT based on the application to be utilized or being utilized.
Figure 3B:
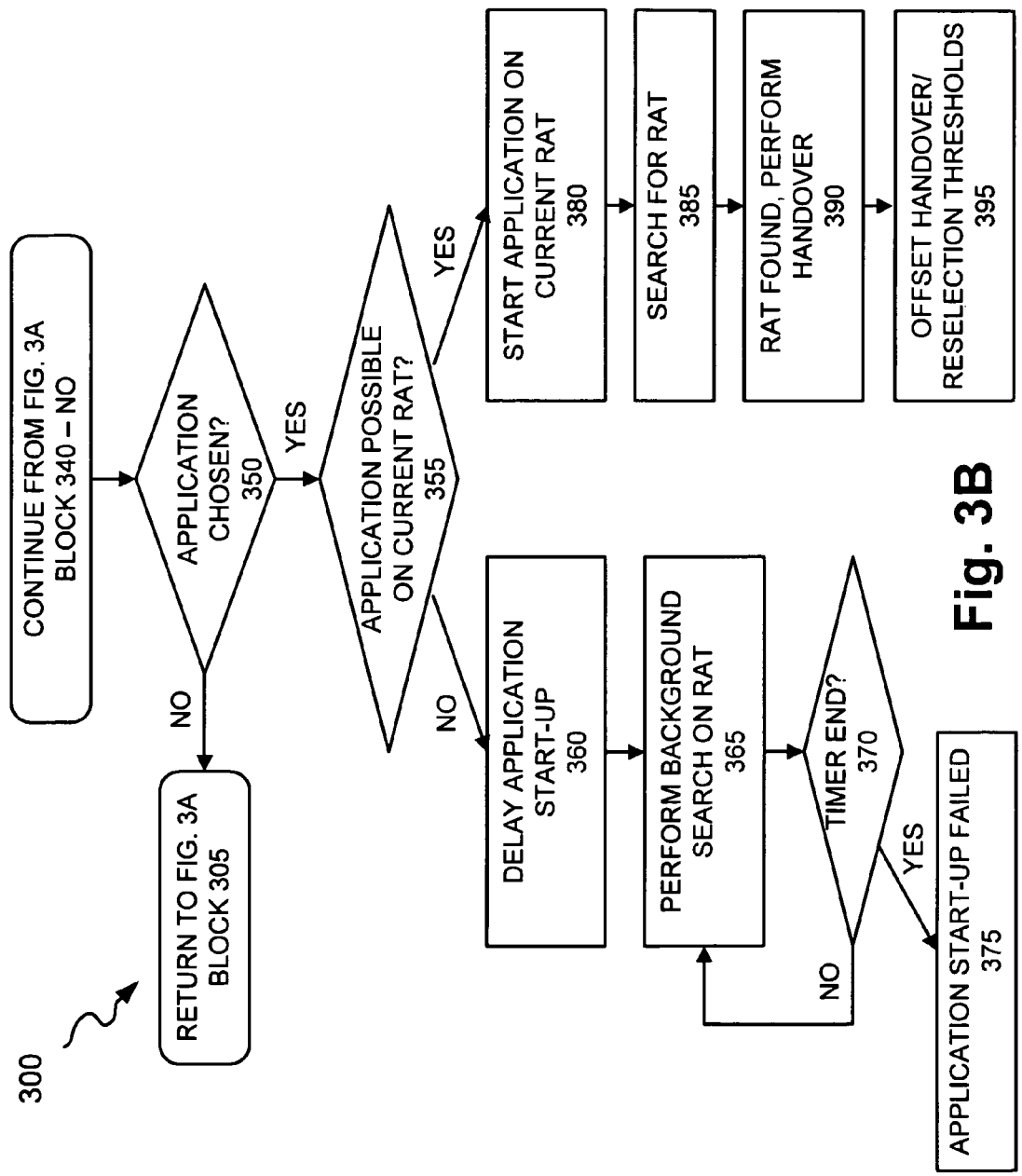

As mentioned, embodiments described herein provide for RAT selection. FIGS. 3A-3B are flow diagrams illustrating an exemplary process 300 for selecting a preferred RAT based on an application to be utilized or being utilized. Additionally, process 300 may consider one or more criteria when selecting the preferred RAT. The one or more criteria may include a cost criterion (i.e., a monetary cost) related to accessing and/or utilizing the RAT for the application, a power consumption criterion (e.g., device 105 may consume less power when the application is being utilized in one RAT over another RAT), a bandwidth criterion (e.g., a RAT may offer more bandwidth than another RAT for the application), and/or an availability criterion (e.g., the application may not be available via a RAT due to access technology specifications, device 105 does not implement the application for a particular RAT).

Process 300 is described from an initial state where device 105 is turned on and connected to a particular RAT. The term "most suitable RAT," is intended to be broadly interpreted to include, for example, one of the RATs indicated in preferred RAT fields 345-355.

Process 300 may begin with reading a user interface (UI) status (block 305). RAT selection manager 230 may monitor a user interface of device 105. For example, the user interface may permit a user to select one or more applications. RAT selection manager 230 may predict an application to be selected based on the interaction of the user with the user interface. For example, if a pointer or selector is close to a particular icon (e.g., an Internet icon), it may be predicted that a Web/Wireless Application Protocol (WAP) browsing application is likely to be chosen. Additionally, or alternatively, RAT selection manager 230 may predict an application to be selected based on a user history. For example, the UI may permit a user to select between two or more applications. RAT selection manager 230 may predict the application to be selected based on the user history. For example, the user history may reveal that the user selects one of the two or more applications more often than the other applications. Additionally, or alternatively, the prediction of an application may be based on a user history associated with location information, time of day, and/or other indicators.

A RAT may be selected based on UI status (block 310). RAT selection manager 230 may select a RAT based on the application to be chosen (i.e., a predicted application). For example, RAT selection manager 230 may consult RAT database 235. RAT selection manager 230 may identify the predicted application in application field 240 and determine a preferred RAT. For purposes of discussion, assume that preferred RAT 1 field 245 specifies the most suitable RAT for a given application. In such an implementation, RAT selection manager 230 may select the RAT specified in preferred RAT 1 field 245.

It may be determined whether the user device is already camped on the RAT (block 315). RAT selection manager 230 may determine whether the user device is already utilizing the selected RAT (e.g., the RAT specified in preferred RAT 1 field 245). When it is determined that the user device is already camped on the RAT (block 320-YES), handover and/or cell reselection thresholds may be offset (block 320). In other words, RAT selection manager 230 may ensure that when the user device is already utilizing the most suitable RAT, the user device continues to utilize that RAT. In one embodiment, RAT selection manager 230 may offset handover and/or cell reselection thresholds (e.g., parameters typically received from the network or defined in a standard for a RAT) so that the selected RAT continues to be utilized even though there may be other RAT(s) having better signal strength, etc. For example, the offset could be an infinity value (e.g., where the user device uses the selected RAT until, for example, the call, is dropped (e.g., due to coverage)). Additionally, or alternatively, RAT selection manager 230 may offset handover and/or cell reselection thresholds to a positive dB (e.g., +xdB). In other instances, other types of offsets may be employed depending upon the thresholds implemented for a particular RAT.

It may be determined whether an application has been chosen (block 325). RAT selection manager 230 may monitor the user interface of device 105 to determine whether the user has actually selected an application. When it is determined that an application has not been chosen (block 325-NO), then process 300 may return to block 305. In such an instance, the handover and/or reselection thresholds may not be utilized (i.e., stopped).

However, when it is determined that the application has been chosen (block 325-YES), then the application may be started (block 330). Device 105 may receive an input, for example, from a user, indicating that an application should be started. Device 105 may start the application and utilize the most suitable RAT which corresponds to the RAT selected by RAT selection manager 230 in block 310. The handover and/or reselection threshold offsets may be utilized throughout the life-cycle of the chosen application.

Returning to block 315, when it is determined that the user device is not already camped on the RAT (block 315-NO), a background search for a RAT may be performed (block 335). In the case when device 105 is not already utilizing the most suitable RAT (e.g., RAT selection manager 230 may determine this by consulting RAT database 235), device 105 may start a cell search and may conduct measurements (e.g., on layer 1-layer 3) to find the most suitable RAT. For example, device 105 may receive a neighboring cell lists from the network (e.g., network 115) and use that information in order to determine which carrier frequencies to find the most suitable RAT on. In other circumstances, where this type of list is not available, device 105 may reference a history list, which may be stored in device 105, to perform a search. For example, based on the history list, device 105 may have knowledge that a WCDMA RAT is typically in Frequency band I (e.g., 2 GHz), and therefore search for a WCDMA RAT at these frequencies. Additionally, or alternatively, device 105 may search for the most suitable RAT based on position data. For example, device 105 may have global positioning system (GPS) data or other forms of position information which may be used to find the most suitable RAT. For example, device 105 may store a lookup table that associates position data with earlier detected RATs. Additionally, or alternatively, device 105 may perform a search for a RAT based on other conventional techniques.

It may be determined whether the RAT is found (block 340). When it is determined that the RAT has been found (block 340-YES), the RAT may be selected (block 345). Device 105 may perform existing reselection operations to select the most suitable RAT. Thereafter, process 300 may continue to blocks 320 and 325, as previously described.

On the other hand, when it is determined that the RAT is not found (block 340-NO), it may be determined whether the application has been chosen (block 350)(FIG. 3B). RAT selection manager 230 may monitor the user interface of device 105 to determine whether the user has actually selected an application. When it is determined that the application has not been chosen (block 350-NO), process 300 may continue to block 305. On the other hand, when it is determined that the application has been chosen (block 350-YES), then it may be determined whether the application chosen can be started on the current RAT (block 355). RAT selection manager 230 may consult RAT database 235 to determine whether the application chosen can be utilized given the current RAT. For example, referring to FIG. 2B, if the application corresponds to video and the current RAT corresponds to GSM/WLAN, RAT selection manager 230 may determine that the application chosen cannot be utilized given the current RAT. On the other hand, if the application corresponds to video and the current RAT corresponds to LTE, RAT selection manager 230 may determine that the application chosen can be utilized given the current RAT.

When it is determined that the application chosen cannot be started on the current RAT (block 355-NO), then the startup of the application may be delayed (block 360). RAT selection manager 230 may delay the starting of the application (e.g., 1-20 seconds) in order to find a RAT that would permit the application to be utilized. This approach is unlike existing techniques where the application is terminated.

A background search for the RAT may be performed (block 365). RAT selection manager 230 may perform operations analogous to those previously described in block 335. It may be determined whether a timer has ended (block 370). RAT selection manager 230 may perform the operations in block 365 for a specified period of time. When it is determined that the timer has not ended (block 370-NO), then process 300 may continue to perform background measurements for the RAT (block 365). On the other hand, when it is determined that the timer has ended (block 370-YES), the start-up of the application may fail (block 375). When the timer has ended, device 105 may indicate to the user that the application cannot be started. For example, a user interface may indicate that an appropriate RAT or connection cannot be established for the application.

Returning to block 355, when it is determined that the application chosen can be started on the current RAT (block 355-YES), then the application may be started on the current RAT (block 380). Device 105 may start the application chosen. A preferred RAT may be searched (block 385). Even though the application chosen may be started on the current RAT, RAT selection manager 230 may search for a more suitable RAT. For example, RAT selection manager 230 may perform operations analogous to those described in block 335. When a RAT is found, a handover may be performed (block 390). Device 105 and network 115 may perform a handover according to existing techniques when a more suitable RAT is found. Thereafter, handover and/or cell reselection thresholds may be offset (block 395), as previously described with respect to block 320. The handover and/or cell reselection threshold offsets may be utilized throughout the usage of the chosen application. The offsets may be removed once the application has terminated.

Although, FIGS. 3A and 3B illustrate an exemplary process 300, in other implementations, process 300 may include additional, fewer or different operations than those described. For example, RAT selection manager 230 may not select a preferred RAT when connection to the network may be lost and/or service, etc. may be interrupted.

The foregoing description of implementations provides illustration, but is not intended to be exhaustive or to limit the implementations to the precise form disclosed.

In addition, while a series of block have been described with regard to the process illustrated in FIGS. 3A and 3B, the order of the blocks may be modified in other implementations. Further, non-dependent blocks may be performed in parallel. It is also to be understood that the processes illustrated in FIGS. 3A and 3B and/or other processes or operations as they have been described herein, may be performed by one or more devices based on instructions stored on a computer-readable medium.

It will be apparent that the device(s) described herein may be implemented in many different forms of software, firmware, and hardware in the implementations illustrated in the figures. The actual software code or specialized control hardware used to implement these concepts does not limit the invention. Thus, the operation and behavior of a device(s) was described without reference to the specific software code—it being understood that software and control hardware can be designed to implement the concepts based on the description herein.

The term "may" is used throughout this application and is intended to be interpreted, for example, as "having the potential to," "configured to," or "being able to", and not in a mandatory sense (e.g., as "must"). The terms "a", "an", and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method of operating a wireless communications device, the method comprising:
    predicting an application expected to be used based on a user's interaction with the wireless communications device, where predicting the application expected to be used comprises:
        determining a current status of a user interface of the wireless communications device based on the user interaction, and
        predicting the application expected to be used based on the determined current status of the user interface;
    determining a preferred radio access technology (RAT) based on the predicted application;
    determining whether the wireless communications device is currently utilizing the determined preferred RAT as a current RAT; and
    performing one of:
        ensuring that the wireless communications device continues to utilize the current RAT when the determined preferred RAT corresponds to the current RAT, or
        searching for the determined preferred RAT when the current RAT does not correspond to the determined preferred RAT and selecting the determined preferred RAT, based on the searching, when the determined preferred RAT is found.

2. The method of claim 1, where the predicting further comprises:
    predicting the application to be used based on one or more of past user history behavior, location information, or time of day.

3. The method of claim 1, where the determining of the preferred RAT is based on one or more of a monetary cost criteria, a power consumption criteria associated with the wireless communications device, a bandwidth criteria, or an application availability criteria.

4. The method of claim 3, where the monetary cost criteria includes at least one of minimizing roaming fees or minimizing a cost associated with utilizing a service with respect to the predicted application.

5. The method of claim 1, where the ensuring is performed, and where the ensuring comprises:
    preventing reselection of a RAT or handover to a different RAT based on an offset of a reselection threshold or an offset of a handover threshold.

6. The method of claim 1, where the searching is performed, and where the searching comprises:
    receiving a neighboring cell list from a network; and
    searching for the determined RAT based on the neighboring cell list.

7. The method of claim 1, where the searching is performed, and where the searching comprises:
    searching based on a history list of previously used or detected RATs and carrier frequencies, or
    searching based on a history list of previously used or detected RATs based on current position data of the wireless communications device.

8. The method of claim 1, further comprising:
receiving a selection of an application; and
determining whether the current RAT supports the selected application.

9. The method of claim 8, further comprising:
starting the selected application when it is determined that the current RAT supports the selected application;
determining whether the wireless communications device is utilizing the determined preferred RAT;
performing a search for the determined preferred RAT when the current RAT does not correspond to the determined preferred RAT;
performing a handover to the determined preferred RAT if the determined preferred RAT is found based on the search; and
when the determined preferred RAT is found the ensuring comprises:
preventing reselection of a RAT or handover to a different RAT based on an offset of a reselection threshold or an offset of a handover threshold, where the offset of the reselection threshold or the offset of the handover threshold is maintained until the selected application is terminated.

10. The method of claim 8, further comprising:
delaying a starting of the selected application when it is determined that the current RAT does not support the selected application;
performing a search, for a period of time, to find the determined preferred RAT that supports the selected application; and
indicating an application start-up failure when the period of time expires without finding the determined preferred RAT that supports the selected application.

11. A wireless communications device comprising:
at least one processor configured to:
predict an application expected to be used based on a user's interaction with the wireless communications device, where the at least one processor, when predicting the application expected to be used, is further to:
determine a current status of a user interface of the wireless communications device based on the user interaction, and
predict the application expected to be used based on the determined current status of the user interface,
determine a preferred radio access technology (RAT) based on the predicted application,
determine whether a current RAT being utilized by the wireless communications device corresponds to the determined preferred RAT, and
perform one of:
ensure that the wireless communications device continues to utilize the current RAT when the determined preferred RAT corresponds to the current RAT, or
search for the determined preferred RAT when the current RAT does not correspond to the determined preferred RAT, and select the determined preferred RAT, based on the searching, when the determined preferred RAT is found.

12. The wireless communications device of claim 11, where, when determining the preferred RAT, the at least one processor is further configured to:
determine the preferred RAT based on one or more of a monetary cost criteria, power consumption associated with the wireless communications device criteria, bandwidth criteria, or an application availability criteria;

13. The wireless communications device of claim 12, where the application availability criteria indicates whether a particular RAT supports the predicted application.

14. The wireless communications device of claim 11, where, when ensuring that the wireless communication device continues to utilize the current RAT, the at least one processor is further configured to:
prevent reselection of a different RAT or handover to a different RAT by offsetting one or more threshold values that govern reselection or handover with respect to the current RAT.

15. The wireless communications device of claim 11, where the at least one processor is further configured to:
receive a user selection of an application,
determine whether the current RAT supports the user selected application.

16. The wireless communications device of claim 15, where the at least one processor is further configured to:
start the selected application when it is determined that the current RAT supports the selected application;
determine whether the wireless communications device is utilizing the determined preferred RAT;
perform a search for the determined RAT when the current RAT does not correspond to the determined preferred RAT; and
perform a handover to the determined preferred RAT if the determined preferred RAT is found based on the search.

17. The wireless communications device of claim 15, where the at least one processor is further configured to:
delay a starting of the selected application when it is determined that the current RAT does not support the selected application;
perform a search, for a period of time, to find the determined preferred RAT that supports the selected application; and
indicate an application start-up failure when the period of time expires without finding the determined preferred RAT that supports the selected application.

18. The wireless communications device of claim 11, where, when the determining the preferred RAT, the at least one processor is further configured to:
consult a database that identifies one or more preferred RATs that support the predicted application, where the one or more RATs are prioritized based on one or more of a monetary cost criteria, a power consumption criteria associated with the wireless communications device, a bandwidth criteria, or an application availability criteria.

19. A computer-readable medium containing instructions executable by at least one processor of a wireless communications device, the computer-readable medium comprising:
one or more instructions for predicting an application that will be started based on a user's interaction with the wireless communications device, where the one or more instructions for predicting the application further include:
one or more instructions to determine a current status of a user interface of the wireless communications device based on the user interaction, and
one or more instructions to predict the application based on the determined current status of the user interface;
one or more instructions for determining a preferred radio access technology (RAT) based on the predicted application;
one or more instructions for determining whether a current RAT being utilized by the wireless communications device corresponds to the preferred RAT;

one or more instructions for ensuring that the wireless communications device continues to utilize the current RAT when the preferred RAT corresponds to the current RAT; and one or more instructions for searching for the preferred RAT when the current RAT does not correspond to the preferred RAT.

20. The computer-readable medium of claim 19, where the determining the preferred RAT is based on one or more of a monetary cost criteria, a power consumption criteria associated with the wireless communications device, a bandwidth criteria, or an application availability criteria.

* * * * *